United States Patent

[11] 3,568,087

[72] Inventors Robert J. Phelan, Jr
Concord, Mass.;
Robert H. Rediker, Newton, Mass.
[21] Appl. No. 472,536
[22] Filed July 16, 1965
[45] Patented Mar. 2, 1971
[73] Assignee Massachusetts Institute of Technology
Cambridge, Mass.

[54] OPTICALLY PUMPED SEMICONDUCTOR LASER
1 Claim, 12 Drawing Figs.
[52] U.S. Cl............................................. 331/94.5,
317/234
[51] Int. Cl............................................. H01s 3/18
[50] Field of Search................................331/94.5;-
317/235/27; 307/312; 313/108(D), 108.1; 330/4.3;
250/199; 332/7.51

[56] References Cited
UNITED STATES PATENTS

| | | | |
|---|---|---|---|
| 3,059,117 | 10/1962 | Boyle et al. | 331/94.5 |
| 3,245,002 | 4/1966 | Hall | 331/94.5 |
| 3,258,718 | 6/1966 | Zeiger et al. | 331/94.5 |
| 3,284,722 | 11/1966 | Gray | 331/94.5 |
| 3,311,844 | 3/1967 | DiCurcio | 331/94.5 |
| 3,341,787 | 9/1967 | Biard et al. | 331/94.5 |
| 3,353,114 | 11/1967 | Hanks et al. | 331/94.5 |

OTHER REFERENCES

Dumke:" Interband Transitions," Phys Rev, vol 127 pp 1559—1563, Sept, 1962 " Electronics Newsletters," Electronics, vol 37, pg 17, August 24, 1964 Fowler; " Some Effects," Ball. Am. Phys. Soc., vol 8, pg 202, March, 1963 Lax," Semiconductor Masers," Proceedings of the Symposium on Optical Masers, Polytechnic Press, New York, pg 119—130, April 1963 Phelan et al. (I), " Optically Pumped," App. Phys. Lett. vol 6, pp 70—71, Feb. 15, 1965 Phelan et al. (II), " Infrared InSb Laser" App. Phys. Lett. vol 3, pp 143-145, Nov. 1, 1963.

*Primary Examiner*—Ronald L. Wilbert
*Assistant Examiner*—Edward S. Bauer
*Attorneys*—Edward D. Thomas, Robert T. Dunn and Thomas Coach ABSTRACT: A semiconductor laser is provided including a body of semiconductor material enclosed within an optical cavity the reflectors of which may be formed by the ends of the body and an intense beam of electromagnetic energy is directed to at least a portion of the body of semiconductor material between the reflectors, the intensity being sufficient to produce an inverted population of energy states within the material accompanied by direct transitions of energy states from an elevated state to a lower state producing radiation which is amplified within the optical cavity by the process of stimulation producing a beam of coherent radiation which is launched from the body.

PATENTED MAR 2 1971  3,568,087

INVENTORS
ROBERT J. PHELAN JR.
BY  ROBERT H. REDIKER

*Robert T. Dunn*
ATTORNEY

OPTICALLY PUMPED InSb EMISSION SPECTRA

INVENTORS
ROBERT J. PHELAN JR.
ROBERT H. REDIKER
BY
*Robert T. Dunn*
ATTORNEY

EFFECT OF PUMP POWER AND MAGNETIC FIELD ON SPONTANEOUS EMISSION SPECTRUM

MAGNETIC FIELD EFFECT ON EMISSION INTENSITY
(below threshold)

InSb OSCILLATORY MAGNETOEMISSION

InSb LASER THRESHOLD vs LONGITUDINAL MAGNETIC FIELD

INVENTORS
ROBERT J. PHELAN JR.
ROBERT H. REDIKER
BY
*Robert T. Dunn*
ATTORNEY

OPTICALLY PUMPED SEMICONDUCTOR LASER

This invention relates to semiconductor laser devices and more particularly to such a device which is pumped by optical energy directed to the semiconductor.

A variety of semiconductor materials have been successfully energized so that lasering action occurs in a semiconductor material accompanied by the production of a substantially coherent beam of radiation. It has been suggested that the semiconductor can be pumped by optical energy. For example, it has been suggested that incident light energy gives rise to hole-electron pairs in a silicon wafer and these in turn create excitons in the silicon which are temporarily bound to ionized phospherous atoms. The excitons subsequently recombined accompanied by emission of a photon and a phonon. This sort of recombination producing a phonon is commonly termed an indirect transition.

Indirect transitions occur in semiconductor materials such as germanium and silicon in which the valence band maximum and the conduction band minimum are displaced from each other along the momentum axis in the energy momentum diagram. Thus, when an electro makes a transition downward from a conduction band to a valence band it also excites a phonon and it must provide energy for the phonon. Hence the energy of the emitted photon which accompanies the transition is substantially less than the energy gap of the transition. The indirect transition is, therefore, a second order process and has a lower probability and is less efficient than the direct transition process which involves only the emission of a photon. Accordingly, it is very difficult to make efficient light emitting semiconductor lasers from indirect gap materials.

It is one object of the present invention to provide an optically pumped direct gap semiconductor laser device.

It is another object to provide a laser device energized by electromagnetic energy at optical or near optical frequency, which is directed to a body of semiconductor material producing coherent radiation, accompanying substantially only direct transitions of electrons from high to low energy states within the material.

It has also been suggested that an optically pumped cyclotron-resonance maser is feasible. This has been suggested by B. Lax on page 435 in "Quantrum Electronics," published by Columbia University Press in New York in 1960. Some of the work done by Lax et al. on Magneto-optical Masers is described in copending U.S. Patent Application Ser. No. 397,165, filed Sept. 17, 1964 by Robert J. Phelan, Jr., et al. An article in the Sept., 1963 edition of Soviet Physics, Doklady Vol. 8, No. 3, by Basov, Lisitsyn and Osipov, entitled "The Use of a Laser for the Excitation of Recombinational Radiation and Semiconductors," describes recombination radiation observed issuing from germanium, silicon, and gallium arsenide in response to incident coherent radiation from a pulsed ruby laser. Recombination radiation, as is well-known, is a type of luminescence which occurs in many materials in response to the incidence of electrical, optical, or other types of energy. Thus, the occurrence of recombination radiation in a semiconductor material does not require the preoccurrence of an inverted population of energy states of electrons as does the well-known lasing phenomenon. Furthermore, the occurrence of recombination radiation does not in and of itself establish that the lasing phenomenon would be possible if a suitable optical cavity were provided enclosing the material. There are a number of ways known in the art to distinguish between recombination radiation and laser radiation and so the occurrence of lasing action can be detected readily.

It is another object of the present invention to provide a direct gap semiconductor laser which is pumped by optical or near optical energy incident upon the semiconductor from an intense source such as a semiconductor diode laser which is energized electrically so that the optically pumped semiconductor laser is controlled electrically without electrical connection thereto.

The magneto-optical laser mentioned above and described in the above-mentioned copending U.S. Patent Application, Ser. No. 397,165, is a semiconductor diode energized electrically and disposed in a powerful magnetic field. The strength and direction of the magnetic field relative field. The strength and direction of the magnetic field relative to the direction of electron injection at the diode junction has numerous marked effects on the operation of the diode laser. For example, when the direction of the magnetic field is parallel to the direction of electron injection (longitudinal direction of the magnetic field) it is discovered that overall performance of the diode laser was much improved in just about all respects. On the other hand, when the magnetic field is directed transverse to the direction of electron injection, little or no improved performance was observed. Improved performance is manifested by reduction in lasing threshold, increase in output radiation intensity, and a uniformity of output spectrum shift with shifts in magnetic field strength.

It is another object of the present invention to provide an optically pumped semiconductor laser with additional means including a strong magnetic field in which a semiconductor is disposed for improving the performance of the laser.

It is another object to employ an intense magnetic field to reduce the lasing threshold of an optically pumped semiconductor laser.

It is another object to employ magnetic field to provide optimum output radiation and intensity from an optically pumped semiconductor laser.

It is another object to employ a magnetic field of suitable strength and direction to cause substantial narrowing in the band of radiation from an optically pumped semiconductor body.

In accordance with a principal feature of the invention, a slab of semiconductor material, preferably of a type which exhibits a high probability for direct conduction band to valence band transitions, donor to valence band transitions, or conduction band to acceptor transitions is provided with optically polished surfaces on opposing faces thereof defining an optical cavity. Intense optical energy is directed to the semiconductor material in the optical cavity so that an inverted population of energy states is produced in the semiconductor material accompanied by the lasing phenomena which produces an intense beam of substantially coherent radiation along the axis of the cavity.

In one embodiment, optical energy from, for example, a diode laser is directed to the selected semiconductor material, equipped with optical reflecting surfaces defining an optical cavity, the cavity direction being substantially transverse to the direction of the incident optical energy. The semiconductor material is of the direct gap type. That is to say, there is a relatively high probability of producing an inverted population of energy states in the semiconductor material when sufficient energy is directed to the material so that direct transitions occur accompanied by emission of substantially coherent radiation. Since the optical cavity is directed transverse to the incident optical pumping energy from the diode laser, the coherent radiation generated within the semiconductor emerges from the optical cavity in a direction transverse to the incident energy. In this embodiment, the incident pumping radiation is preferably directed to the semiconductor body along the entire length of the optical cavity and although this radiation penetrates only about a micron into the material, the diffusion length of electrons and holes produced by the incident pumping radiation spreads substantially throughout the lasing region of the cavity.

In another embodiment, the incident pumping radiation is directed to the semiconductor material substantially parallel to the direction of the optical cavity enclosing the material. Here, the body of semiconductor is relatively thin, on the order of $1/\alpha$ where $\alpha$ is the absorption coefficient of the material for the direct gap transition radiation produced therein. As a result, laser radiation is emitted from one or both ends of the optical cavity enclosing the body of semiconductor material in directions parallel to the incident optical pumping energy. Increasing the thickness of the body of semiconductor material causes the emitted radiation to shift to lower energies and also increases the lasing threshold.

A variation of either of the above-described embodiments includes one or more diode lasers which are electrically energized in unison or electrically energized from a source in response to coded signals, with means for directing the optical energy from these diode lasers to any one of a selected multitude of bodies of semiconductor material, each including an optical cavity enclosing the portion of the semiconductor to which the optical energy is directed so that intense coherent radiation is launched from the cavity toward a target. Additional embodiments of the invention include means for providing an intense magnetic field directed longitudinally or transverse to the direction of the incident optical pumping energy, the intensity and relative direction of the magnetic field being selected to improve overall performance and efficiency of the system or produce certain desired effects as shown herein. Other features and objects of the present invention will be apparent from the following specific description taken in conjunction with the figures in which:

Figure 10:
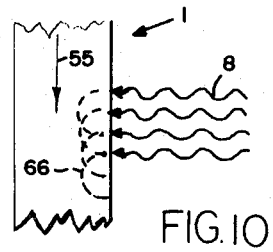
Figure 9:
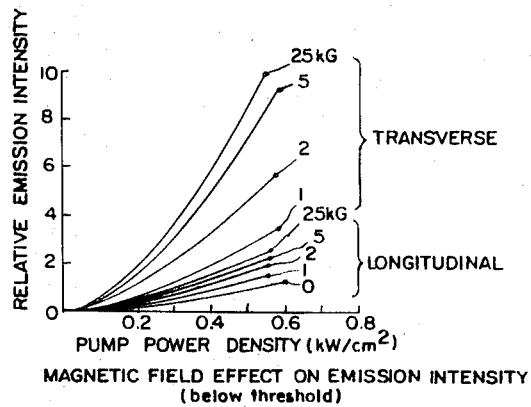
Figure 12:
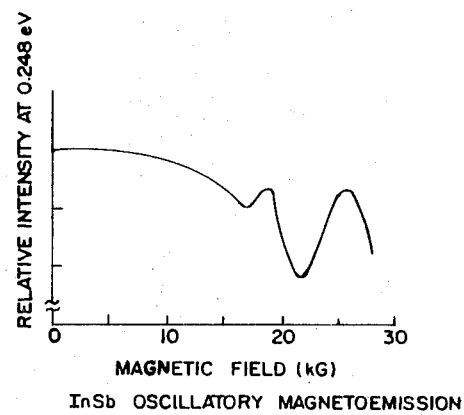
Figure 11:
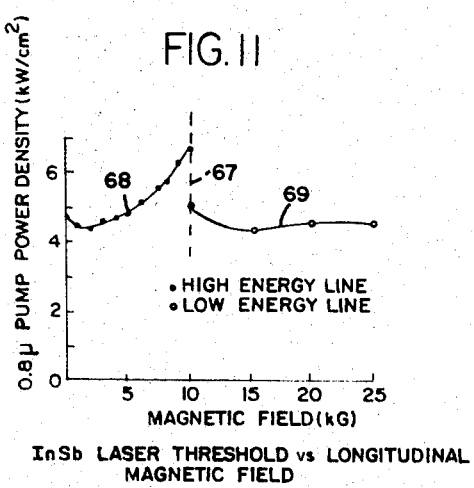

FIG. 9 includes curves illustrating frequency and intensity shifts of radiation from an optically pumped InSb laser caused by magnetic field intensity changes;

FIG. 10 illustrates the relative effects on performance of an InSb optically pumped semiconductor laser of the transversely directed and longitudinally directed magnetic field;

FIG. 11 shows curves illustrating the shift in dominating transitions occurring in the InsSb semiconductor laser due to magnetic field strength; and FIG. 12 illustrates variation in intensity of one narrow spectral line from an InSb semiconductor optically pumped below lasering threshold and showing Landau level variations due to magnetic field strength changes.

Figure 1:
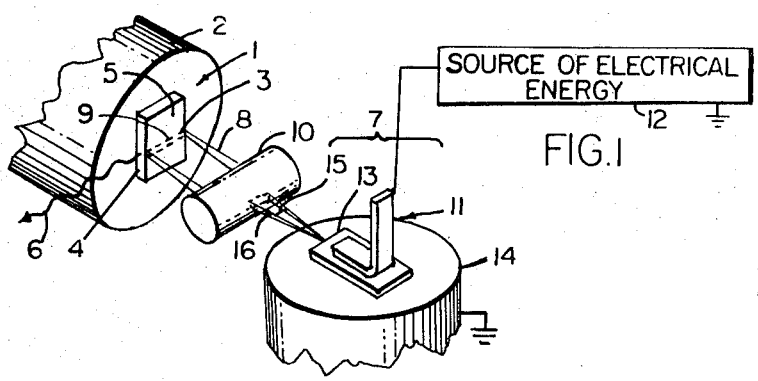
FIG. 1 illustrates a portion of an optically pumped semiconductor laser system including a slab of semiconductor material enclosed in an optical cavity directed transverse to incident optical pumping energy, a lens device for directing the optical energy to the slab and a diode laser for generating the optical energy.

Turning first to FIG. 1, there is shown one suitable structure for optically pumping a direct gap-type semiconductor laser. The laser includes a chip, for example, of $n$-type InSb, the $n$-concentration being on the order of 7 to 10 times $10^{13}$ cm.$^{-3}$ with a $\mu$ of at least 6 times $10^5$ cm.3 $v^{-1}$ second$^{-1}$ at 77° K. The chip 1 is mounted on a cold finger 2 of copper which is in contact with liquid helium so that the temperature of the chip is maintained below 77° K. Two 110 faces 3 and 4 of the chip of InSb are cleaved perpendicular to the 100 face 5 to form a Fabray-pirot cavity between the two cleaved faces. Thus, coherent radiation denoted by the arrow 6, issuing from the chip of InSb, is in the direction of the cavity. Emission in any other direction not parallel to the cavity is inhibited by roughening other faces of the chip of InSb and by having one face in the shadow of the optical pumping system 7.

The pumping radiation 8 is preferably of very narrow band and very intense and is directed to a narrow strip 9 of the InSb chip parallel to the direction of the Fabray-Pirot cavity. Thus, an inverted population of energy states of electrons in the immediate vicinity of this narrow strip is achieved and the lasering action occurs where this population exists. One suitable system for generating the intense narrow band of pumping radiation and directing it to the InSb chip, includes a cylindrical lens 10 and a diode semiconductor laser 11 energized by electrical energy such as electrical pulses from a source 12. The diode laser 11 may be, for example, a GaAs diode 13 mounted on a heat sink 14 in contact with liquid helium so that the temperature of the diode is maintained below 77° K. The diode is oriented on the heat sink so that the beam of pumping radiation 8 issues therefrom substantially all in one direction and is directed by cylindrical lens 10 to the chip of InSb.

In cases where it is desirable that the output be proportional to the input, pulses from the source 12 are applied to the diode 13, the intensity of the pulses being preferably sufficient to produce substantially constant beam angles 15 and 16 of pumping radiation issuing from the diode. This can be achieved when the diode current pulses are about 4 amps. When the current pulses are increased to about 14 amps, the average power density of pumping radiation incident on the chip of InSb is about 5,000 watts/centimeters$^2$. The width of the beam is established by the distance between the InSb chip and the diode and the beam angle 15. The height of the beam is established by the vertical beam angle 16 and the focusing effect of the lens 10, if such a lens is used. The height at the point of incidence with the chip of InSb is sufficiently small to insure at least the high power density mentioned above.

It has been observed that diode lasers fabricated from the same type of InSb material have lasering thresholds at 4.2° K of about 1,000 amps/centimeters2. This threshold can be compared with an estimated equivalent threshold of the InSb chip shown in FIG. 1 operated at the temperature 4.2° K. For example, taking into account a reasonable amount of reflection of the incident pumping beam from the surface of the InsSb and assuming that one electron hole-pair is created for each absorbed photon of pumping beam energy, the threshold for lasering action is estimated to be about 2,000 amps/eentimeter$^2$. This compares quite favorably with the above mentioned threshold of a similar diode junction InSb laser.

Figure 3:
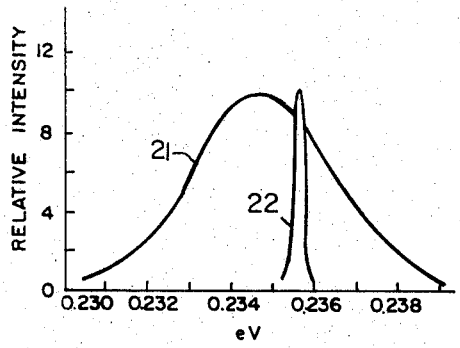
FIG. 3 illustrates output radiation spectra showing typical band narrowing achieved employing optically pumped InSb indicating the occurrence of lasering action therein.

FIG. 3 is a plot of the relative intensity of output radiation 6 from the InSb chip as a function of photon energy. Thus, this figure illustrates the bandwidth of output radiation. The broad bandwidth curve 21 shows the spectrum of the spontaneous emission radiation which is below lasering threshold and the narrow band curve 22 illustrates the spectrum of the laser radiation. As can be seen, line narrowing is considerable and, accordingly, it demarks spontaneous emission or photoluminescence from laser emission.

Figure 4:
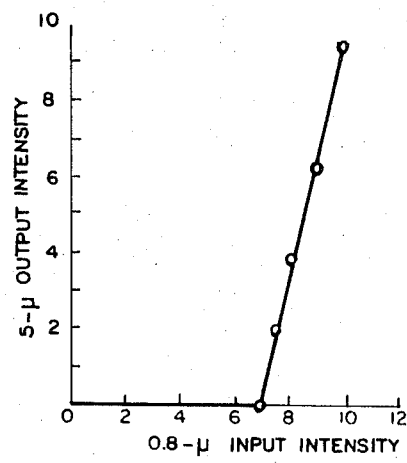
FIG. 4 is a plot illustrating the relative intensities of the InSb optically pumped laser radiation and the incident pumping radiation.

FIG. 4 also illustrates the demarcation between spontaneous emission and laser radiation. This is a plot of output density of the 5 micron line from the InSb chip versus the input intensity of the 0.8 micron line from the GaAs. As can be seen, the output intensity suddenly rises very sharply at an input intensity of 7 units. This is the lasering threshold for the combination of output and input lines shown.

Figure 2:
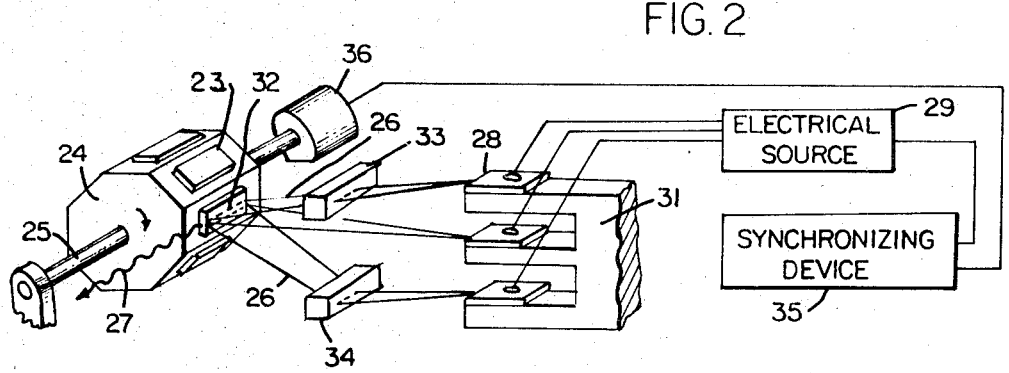
FIG. 2 illustrates a multitude of optically pumped semiconductor slabs selectively oriented to intercept optical pumping energy from a multitude of sources of optical energy which are energized so that the output radiation from the slabs may be controlled as to intensity, wavelength band, and operating intervals.

FIG. 2 illustrates an embodiment including a multitude of chips of optically pumped semiconductor lasers such as 23 mounted to surfaces of a rotating heat sink 24, so that as the heat sink rotates about an axle 25 the various optically pumped laser chips are brought under illumination of the pumping radiation 26 and produce output radiation 27 characteristic of the semiconductor material that the particular chip illuminated is composed of. Thus, by rotating the heat sink, the spectrum of output laser radiation can be changed.

The pumping radiation 26 is produced, for example, by a multitude of diode lasers such as 28 each individually energized from a source of electrical current 29. These pumping diode lasers may be arranged in any convenient manner so that the radiation from them can be directed to the optically pumped semiconductor laser chip that is in position for operation. For example, the pumping diodes may be disposed one above the other as shown in FIG. 2 and mounted to a suitably shaped heat sink 31 which is in contact with a low-temperature fluid, such as liquid helium, to insure efficient operation of the diodes. The method shown for directing the radiation from the diodes to the lasering area 32 in the optically pumped diode includes, for example, optical systems such as 33 and 34 for refracting or reflecting the pumping radiation to the area 32. In operation, the pumping diodes may be energized in unison or in any desired sequence by pulses from the electrical source in response to signals from a synchronizing device 35. Synchronizing device 35 also control rotation of the drum via motor means 36. Thus, the particular optically pumped semiconductor laser selected for operation, the level of operation of the selected laser and/or the pulsing rate of the optically pumped laser may all be controlled by the synchronizing device to accomplish any of the multitude of purposes. For example, by this means, a variety of different optically pumped lasers can be scheduled for operation in any given sequence by sequential rotations of the drum and the intensity of radiation from any of these can be controlled by energizing one or more of the pumping laser diodes. Thus, the transmitted radiation represented by arrow 27 may be varied in wavelength, intensity, and intermittence to thereby convey information to a target upon which the radiation is incident.

Figure 5:
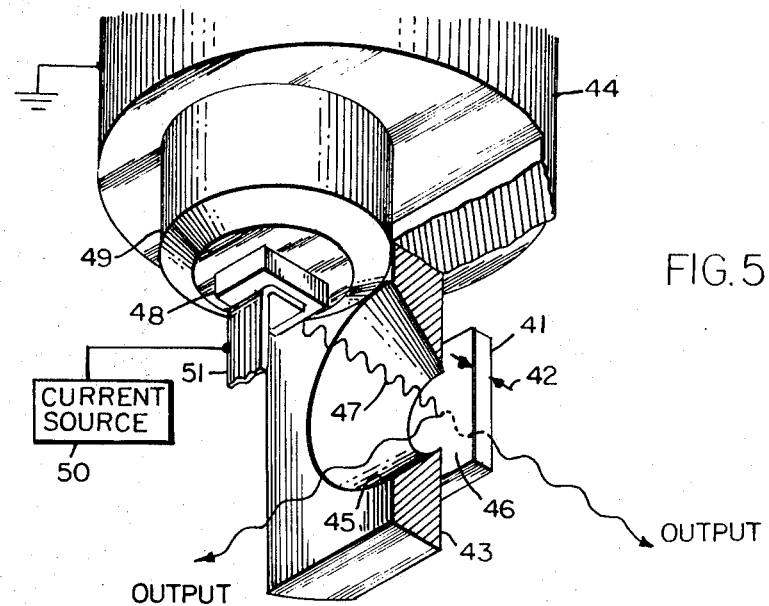
FIG. 5 illustrates an embodiment wherein the incident optical pumping energy is directed to the semiconductor body substantially parallel to the direction of the optical cavity enclosing the body, so that laser radiation generated within the cavity emerges in a direction parallel to the pumping radiation.

Another structure for optically pumping a semiconductor laser is illustrated in FIG. 5. In this embodiment, the optical cavity of the laser is directed parallel to the thin dimension of the chip of semiconductor 41 and the output radiation issues therefrom parallel to this dimension. The chip of semiconductor is preferably of a type producing substantial coherent radiation as a result of direct gap transitions. For purposes of illustration, chip 1 may be $n$-type InSb with n concentration on the order of about 5 to 20 times $10^{13}$ cm.$^{-3}$. In addition, the thickness 3 the chip, denoted by the dimension 42, is preferably on the order of $1/\alpha$ where $\alpha$ is the absorption coefficient for direct gap transitions within the material. Where InSb of the concentration stated is employed, this dimension is on the order of 50 microns.

The chip 41 is mounted to a cold finger 43, extending from a dewar flask 44, containing a fluid at cryogenic temperature, the purpose being to maintain chip 41 at a temperature of about $-77°K$ or lower. The chip is mounted over a tapered hole 45 in the cold finger 43 through which pumping radiation is directed to one broad face 46 of the chip. The optical pumping radiation 47 is launched, for example, from a semiconductor diode 48 which may be GaAs and which is mounted to another cold finger 49, extending from the same dewar flask. The diode 48 is mounted so that the intense optical pumping radiation issuing from it toward the semiconductor chip 41 is directed substantially perpendicular to the broad face 46 of the chip, and thus, parallel to the thin dimension 42 of the chip.

Figure 6:
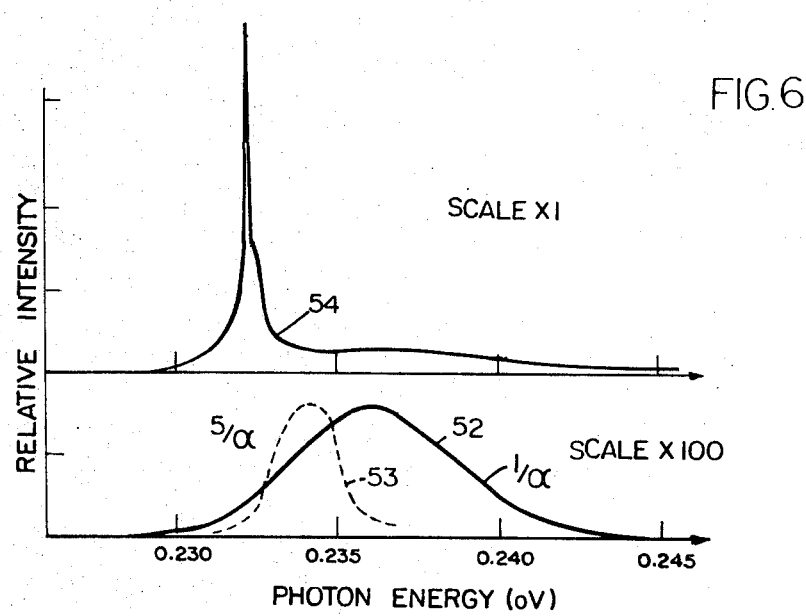
FIG. 6 illustrates the output radiation spectrum obtained with the structure illustrated in FIG. 5 and shows the characteristic line narrowing obtained as lasering action occurs and dominates.
Figure 7:
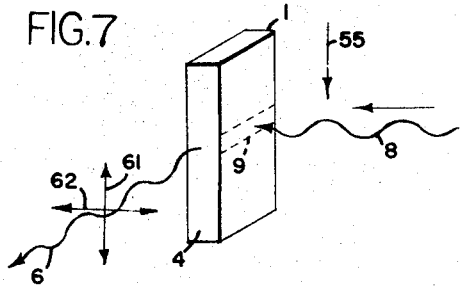
FIGS. 7 and 8 are diagrams which illustrate some of the effects of the magnetic field on the optically pumped InSb semiconductor laser.

In operation, the diode is energized by electrical pulses from a current source 50, applied to the diode lead 51, and as a result produces the intense optical pumping radiation 47, which may be substantially coherent and which impinges on the broad face 46 of the InSb chip. Opposing faces of the chip are equipped with optically flat reflector surfaces in alignment with the incident pumping radiation, and so these surfaces define an optical cavity enclosing the InSb semiconductor material. The incident energy 47 is transitted through the reflecting surface on face 46 producing elevated energy states in the InSb material within the optical cavity. At first, this produces only spontaneous emission radiation or photoluminescence within the InSb material. Examples of the spectrum of this spontaneous emission radiation are illustrated by the lower two curves in FIG. 6. The solid line curve 52 illustrates the spontaneous emission obtained with an InSb chip of thickness substantially $1/\alpha$ and the dotted line spectrum 53 is obtained when the thickness of the chip is substantially $5/\alpha$. Thus, it can be seen, an increase in the thickness of the chip shifts the spontaneous emission output spectrum to lower energy. Thereafter, as the intensity of the incident optical pumping energy from the diode laser is increased by, for example, increasing the energy of current pulses applied to the diode, lasering action occurs within the optical cavity enclosing the InSb chip. The occurrence of lasering is evidenced by substantial line narrowing of the output spectrum and increased output intensity, as shown by the upper spectrum curve 54. The degree of line narrowing of the output spectrum and increased output intensity, as shown by the upper spectrum curve 54. The The degree of line narrowing is readily apparent when spectrum 54 is compared to spectrum 52 and the intensity increase is appreciated when it is noted that the scale of relative intensity for spectrum 52 is 100 times the scale for spectrum 54. Thus, the intensity of output radiation is increased over a 100 times as when the lasering threshold is surpassed.

The effects of magnetic field strength and direction on the optically pumped InSb semiconductor laser are discussed below with reference to FIGS. 7 through 12. In application, the entire structure shown in FIG. 1 is placed in a strong magnetic field so that the chip 1 of InSb is exposed to the magnetic field having a direction indicated by arrow 55. In general, the magnetic field increases the emission intensity from the optically pumped semiconductor laser and also reduces the threshold of energy density of pumping radiation that must be directed to the laser to cause lasering action. Two general effects of the magnetic field appear to be present. The first involves changes in the density of the various energy states throughout the pumped area 9 of the semiconductor. The second involves the effect the magnetic field has on the mobility of charge carriers in the material.

Two relative directions of the magnetic field are particularly noteworthy. These are referred to as the transverse direction represented by arrow 61 in FIG. 7 and the longitudinal direction represented by arrow 62 in the FIG. The transverse direction is transverse to the direction of the pumping radiation 8 and also transverse to the output radiation 6. The longitudinal direction is parallel to the direction of the incident pumping radiation but transverse to the output radiation.

Figure 8:
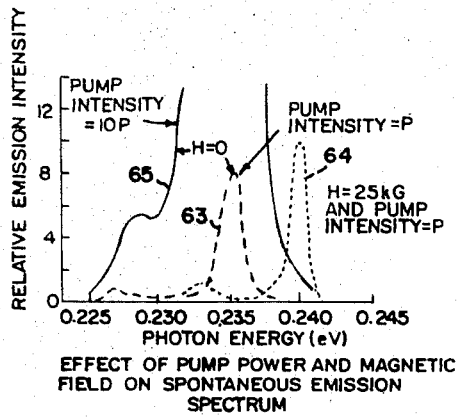

FIG. 8 illustrates the spontaneous emission or photoluminescence spectrum from an optically pumped InSb semiconductor in which there is an $n$-type concentration of $10^{14}$ per cubic centimeter. The three spectra plotted show the effect of pump power intensity and the effect of the magnetic field. The spectrum indicated by the dash line 63 is obtained at zero magnetic field and with optical pumping intensity at a value P. This spectrum serves as a guide. The broken line spectrum 64 is obtained with the same optical pumping power intensity P, but in a magnetic field of strength 25 kg. As can be seen, the effect of the magnetic field is to shift the energy spectrum up about 2 percent. Intensity is increased manifold when the intensity of the incident optical pumping power is increased. This is shown by the solid line curve 65 obtained with pumping power at 10 P and in zero magnetic field. The effects illustrated in FIG. 8 are not unlike the effects of a magnetic field on an InSb semiconductor diode laser such as described in my copending U.S. Pat. application, Ser. No. 397,165.

The relative effects of a longitudinal versus a transverse magnetic field on the operation of the optically pumped InSb laser are illustrated in FIG. 9. This is a plot of relative spontaneous emission intensity versus pump power density for a range of strengths of magnetic fields transverse and longitudinal to the incident pumping radiation. Quite clearly, the greater spontaneous emission intensity is achieved when the magnetic field is transverse. This is different from the effect observed in operation of the magneto-optical diode laser of the same type described in the above mentioned copending application. As an explanation, it is suggested as illustrated in FIG. 10 that the transverse magnetic field represented by the arrow 55 substantially reduced the mobility of the charge carriers which are created by the incident optical pumping energy represented by the arrows 8. In this simple analogue the mobility is decreased because the charge carriers are caused by the magnetic field to follow arcuate paths represented by the broken line paths 66. With a mobility decrease, there is an accompanying increase in local concentration of charge carriers and an inverted population of energy states in the vicinity of this higher concentration is more readily achieved. There is within this area, a higher probability of the transitions which produce the spontaneous emission radiation. Thus, it follows that the lasering threshold is more advantageously effected (reduced more) by the transverse magnetic field that by the longitudinal magnetic field.

In order to illustrate other effects of the magnetic field on the lasering threshold and spontaneous emission intensity besides the above described change in carrier mobility, FIGS. 11 and 12 are presented. As can be seen from FIG. 11, as the longitudinal magnetic field strength (parallel to the direction of the incident radiation) increases there is an initial decrease in the threshold, and then a gradual increase as the number of states per Landau level increases and the lower Landau state takes a greater share of the electrons. At this point, 67, the laser emission shifts from the high energy line 68 to the lower energy line 69. This switch between energy lines is also accompanied by a change in the polarization of the output radiation from the InSb. The high energy line 68 corresponds to a plane polarized output radiation with the E vector perpendicular to the longitudinal magnetic field as represented by the E vector 61 in FIG. 7. The lower energy line 69 corresponds to plane polarization with the E vector parallel to the longitudinal magnetic field as represented by E vector 62 in FIG. 7. The relative intensities of the high and low energy lines and the directions of polarization are consistent with transition from two twin states of the conduction band to a heavy hole band. Evidently, some lasering action amplifies the differences between states and allows observation of lines which are normally masked by thermal broadening. Thus, by increasing the magnetic field strength the polarization of output radiation can be switched between orthogonal directions.

Another effect of the magnetic field on the output radiation from the optically pumped InSb semiconductor is illustrated in FIG. 12. This illustrates the effect of the magnetic field to concentrate electrons into Landau energy levels. Normally this effect is complicated by the large mobility decrease caused by the transverse magnetic field. In order to avoid this, so as to clearly show the Landau level effects caused by the magnetic field, FIG. 12 includes a plot of relative output intensity at .248 e.v. versus magnetic field strength. By observing only the very narrow band of radiation .248 e.v., for which mobilities are rather small, the effect of the magnetic field on mobility is minimized. The plot shows output intensity variation with magnetic field strength that is called herein oscillatory magnetoemission and is expressed in inverse gauss. Similar curves obtained to illustrate oscillatory magnetoemission for other spectral lines closer to the main gap of the InSb material reveal that the period expressed in inverse gauss increases at wavelengths closer to the bandgap. Thus, it is seen that the magnetic field can be varied slightly at selected ranges to accomplish substantial variation of the spontaneous emission output intensity of given spectral lines in the radiation emitted from the optically pumped slab of the InSb. The oscillatory magnetoemission of the one spectral line illustrated in FIG. 12 is obtained during operation below lasering threshold. However, it is evident that a related period, as expressed in inverse gauss would exist when operated above the lasering threshold.

The effects of the magnetic field illustrated in FIGS. 7 to 12 are that the magnetic field, and particularly the orientation of the magnetic field, substantially influences the mobility of charge carriers, and thereby influences the spatial concentration of electron hole-pairs which determines lasering threshold. The photoluminescent spectrum also reveals the effect of the magnetic field on the required intensity of pumping energy to reduce substantial lasering action. The combination of the effect of magnetic field on polarization and the effect of magnetic field on oscillatory magnetoemission reveals that output radiation intensity depends on condensations of states at the Landau levels and that these can be directly controlled by the magnetic field strength.

This concludes the description of a number of embodiments of the present invention, including a body of semiconductor material enclosed between optically flat reflecting surfaces defining a Fabrey-Pirot optical cavity with means for directing intense optical energy to a portion of said material along the optical cavity whereby elevated energy states are produced in said material within said cavity resulting in direct transitions to lower energy states accompanied by the emission of substantially coherent radiation from the cavity. Other and more detailed features of the invention are described by way of example and are not intended to limit the spirit and scope of the invention as set forth in the accompanying claims.

We claim:

1. An optically pumped laser system comprising a plurality of separate bodies of different semiconductor material composition, means for supporting said bodies of semiconductor material in spaced relationship whereby selected of said bodies can be positioned by movement of said supporting means, a plurality of sources of optical energy each producing a beam of said optical energy and means for directing at least one of said beams to said selected body, whereby direct transition lasering action is produced within the optical cavity enclosing said selected body and means for energizing said sources of optical energy, the sequence of energizing said sources and positioning said semiconductor bodies being such that a beam of coherent radiation is produced emanating from said optical cavity, the radiation band, the intensity and the intervals of said radiation being controlled.